March 25, 1969     S. G. BEST     3,434,407
CABIN PRESSURE FAULT DETECTOR
Filed July 28, 1967
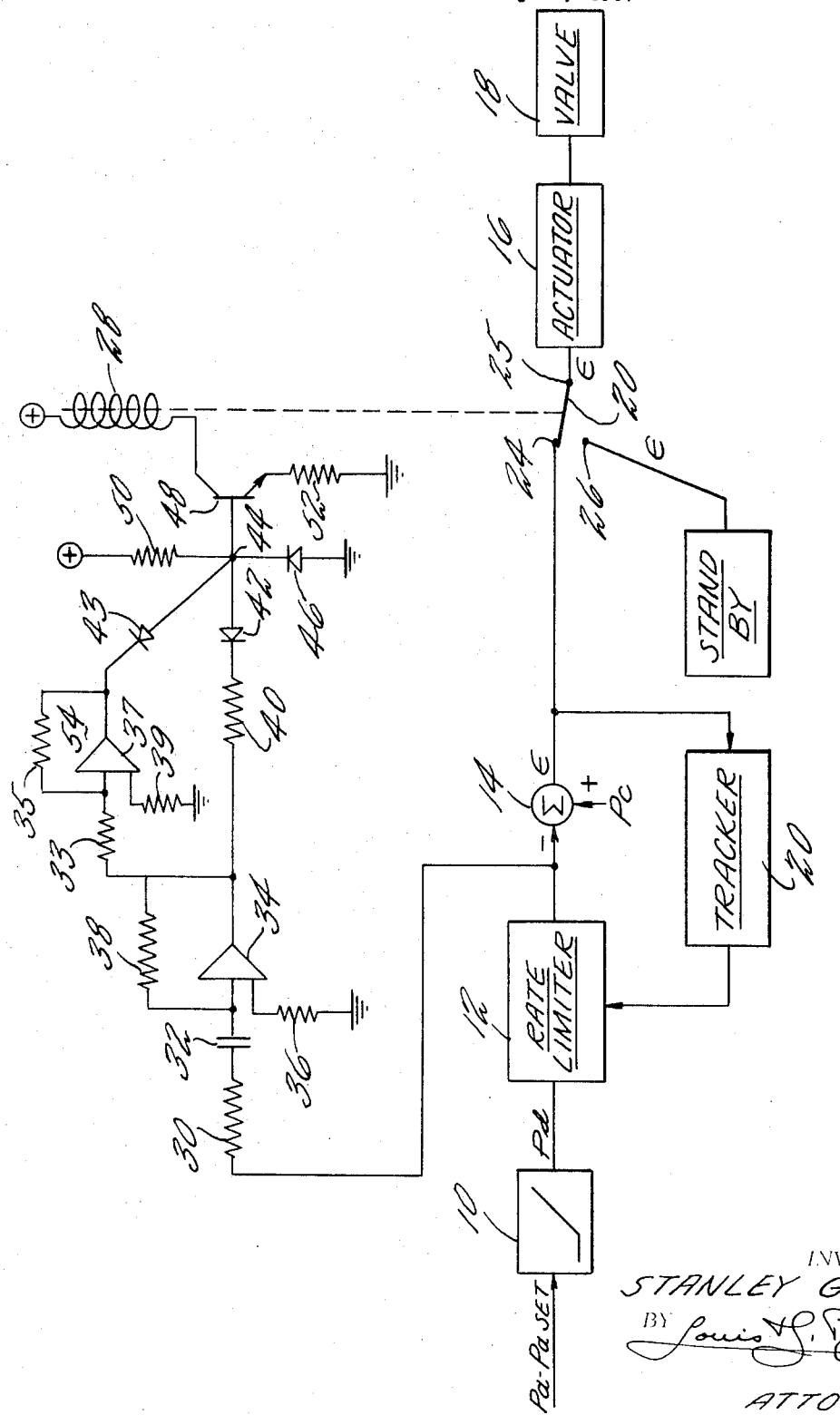
INVENTOR
STANLEY G. BEST
BY Louis H. Reens
ATTORNEY

United States Patent Office 3,434,407
Patented Mar. 25, 1969

3,434,407
CABIN PRESSURE FAULT DETECTOR
Stanley G. Best, Manchester, Conn., assignor to United Aircraft Corporation, East Hartford, Conn., a corporation of Delaware
Filed July 28, 1967, Ser. No. 656,738
Int. Cl. B64d 13/04
U.S. Cl. 98—1.5    8 Claims

ABSTRACT OF THE DISCLOSURE

A device for detecting the faulty operation of an automatic cabin pressure regulator is described. The fault is detected by sensing the excess of the rate of change of a desired cabin pressure signal over a predetermined value as a result of either long term gradual changes or short term sudden variations. The detected fault signal is used to transfer the operation from the automatic control to a standby control.

Background of the invention

In the field of electronic automatic cabin pressure regulators, it is important that adequate provisions are included for protecting the passengers and the aircraft from unusual and excessive conditions. For instance, when a cabin pressure regulator for an aircraft suddenly fails to properly control the pressure so that it increases beyond a safe rate or tends to change suddenly more than a safe amount, the condition may cause discomfort or injury to the passengers as well as damage to the aircraft. In a cabin pressure control where a desired cabin pressure signal is generated, to be subsequently compared with the actual cabin pressure for the control of the pressure in the cabin the detection of faults of the control may be obtained by observing the behavior of the desired cabin pressure signal.

Summary of invention

It is therefore an object of this invention to provide a cabin pressure regulator wherein a signal representative of a cabin pressure is monitored to detect an excess in its rate of change indicative malfunctions and transfer from automatic control of the cabin pressure to a standby control.

Description of the preferred embodiment

The above object is accomplished by a novel circuit arrangement as shown in the figure.

In a copending application by Floyd R. Emmons, U.S. Ser. No. 564,114, now U.S. Patent No. 3,376,803 entitled, "Cabin Pressure Regulator," filed July 11, 1966, and assigned to the same assignee, a cabin pressure control system is described and this is incorporated with this application to the extent necessary to complete the understanding of the description that follows. In the copending application a signal is generated which is indicative of a scheduled change in the external, ambient pressure. During ascent this may be the difference between ambient and the scheduled pressure at the cruising altitude. The ambient pressure $P_a$ is sensed and a signal indicative thereof is obtained. Also, a signal $P_a$ SET is generated indicative of the scheduled external pressure at the cruising altitude of the aircraft. These two external ambient signals are subtracted to produce a difference signal which is applied to a network 10. This network 10 includes a schedule or function generator which, in response to the difference ambient signal produces, at its output, a signal indicative of the desired cabin pressure, $P_d$. The desired cabin pressure signal is then fed to a rate limiter circuit 12 which limits the maximum rate of change of the desired cabin pressure signals to levels commensurate with passenger comfort. The output of the rate limited cabin pressure signal is applied to a summing network 14 to which is also applied a signal indicative of the actual cabin pressure $P_c$. The difference between $P_d$ and $P_c$ is an error signal which is then applied to an actuator 16 which may include an amplifier for driving a valve 18. Generally cabin pressure regulators operate with a source of air under pressure, not shown, to supply air to the cabin and a valve for selectively bleeding the cabin pressure to the external environment is regulated to control the cabin pressure.

The error signal at the output of the summing network 14 is selectively fed back via a tracking circuit 20 to the rate limiter circuit 12. The purpose of the tracking circuit is to maintain the desired cabin pressure signal $P_d$ at the input of summing network 14 to a level within predetermined limits of that of the actual cabin pressure $P_c$. This may be accomplished as described in my copending application entitled "Electronic Schedule Generator Tracking Circuit," U.S. Ser. No. 564,226, now U.S. Patent No. 3,373,675, filed July 11, 1966, and assigned to the same assignee. As a result of the inclusion of the tracking circuit, the desired cabin pressure signal $P_d$ bears some relationship to the actual cabin pressure $P_c$ in that it will never deviate more than a predetermined amount therefrom.

Interposed between the actuator 16 and the summing network 14 is a switch 22 having a single pole with two contacts 24 and 26. This switch 20 is controlled by relay 28. The contact 26 is connected to a standby cabin pressure control system which will take over the control of the cabin pressure upon the detection of a fault in the automatic control system. The desired cabin pressure signal $P_d$ is connected through a differentiating network consisting of a resistor 30 in series with a capacitor 32 to an operational amplifier 34 having a feedback resistor 38. This amplifier essentially operates as a differential amplifier and therefore the other input is coupled to ground through a resistor 36 which for balancing purposes, has approximately the same dc impedance as the first input. The feedback resistor 38 determines in combination with the impedance of the differentiating network, the total gain of the circuit. The output of the amplifier is coupled to a resistor 40 and the cathode of a diode 42. The anode of the diode is coupled to a junction 44 which is connected to ground through a protective diode 46, to the base of a transistor 48 and to a B+ supply through a resistor 50. The transistor 48 has its emitter coupled to ground through a resistor 52 and its collector connected to the B+ supply through the relay coil 28. The transistor 48 is normally conducting in the absence of any fault and thus the junction 44 usually is a fraction of a volt above ground. The output of the amplifier 34 will go negative in response to a positive input and thereby forwardly biases diode 46 producing a slight negative potential to ground at junction 44 to bias off the transistor 48.

At 54 a similar circuit is shown to provide bidirectional fault detection capability. Thus the inverted output from operational amplifier 34 is applied through resistor 33 to second operational amplifier 37. A feedback resistor 35 together with resistor 33 determine the gain and the output of the second operational amplifier is applied through diode 43 to the common junction 44. The amplifier in network 54 responds to and inverts the output of the amplifier and thereby it provides the same function but for the opposite polarity.

The magnitude of the voltage outputs of the amplifiers 34 and 37 in effect, are proportional to rate of change of the desired cabin pressure signal. The resistive and capacitive coupling together with the threshold applied to junction 44 provide the functional response to both slow steady changes as well as rapid sudden jumps. For small amplitude sudden jumps, it is not desirable that the threshold level at junction 44 be exceeded. Since the capacitor 32 appears as a short circuit excessive voltages will be generated at the input to amplifier 34 and consequently junction 44 for even the smallest jumps. The series resistor 30 is added to form a voltage divider with the feedback resistor 38. As a result, the gain of the amplifier 34 is determined by the ratio of these resistors and small sudden jumps of the signal $P_d$ will not overcome the threshold at junction 44 to actuate the relay 28. The threshold voltage at junction 44 is therefore representative of several selected characteristics of the pressure representative voltage. The selected characteristics are shown in the drawing as the maximum permissible slow rate of change of $P_d$ and the maximum permissible rapid change due to sudden jumps.

The threshold function is obtained by applying a positive bias to the junction 44 sufficient for the conduction of transistor 48 as well as for the selection of a switching voltage at which the transistor 48 may be rendered nonconductive. As a result, the combined effect of the switching circuit and the differentiating network followed by the operational amplifiers is that a signal is generated by detecting a fault in the desired cabin pressure signal $P_d$. The cessation of the conduction of transistor 48 terminates the holding action of the relay 28 and by means of latching contacts (not shown) allows the switch 20 to be coupled between the contact 26 and 25. The standby system is used for controlling the cabin pressure until the latches relay is reset.

It is understood that the differentiating network as shown in the embodiment tends to be somewhat noisy and some filtering may be employed by including across the feedback resistor 38 a small capacitance. The values of the capacitor 32, resistor 30, the feedback resistor 38 and the biasing level of the junction 44 are selected in such a manner that the transistor 48 will not be rendered nonconductive unless the rate of the desired cabin pressure signal exceeds a preselected rate, for instance 1½ p.s.i. per minute. The resistors 30 and 38 serve the purpose of establishing an output at the amplifier 34 when sudden changes in the monitored pressure signal occur; i.e., too fast for capacitor 32 to follow and this establishes the threshold for sudden jumps. In addition some delaying action may be employed in either the relay 28 or by electronic means to avoid switching to the standby control system in the event the desired cabin pressure signal exceeds the 1½ p.s.i. per minute limit only for a very brief time, one or two seconds. This delayed action can also be provided by selecting the time constant of the derivative circuit formed by capacitor 32 and resistor 30.

It is to be understood that the invention is not limited to the specific embodiment herein illustrated and described but may be used to sense other pressure signals in the control such as $P_c$, $P_c-P_d$, where a long term slow rate of change in excess of a threshold value or a rapid jump in excess of a threshold value are indicative of a fault.

I claim:

1. A device for transferring the control of an aircraft cabin pressure from automatic to a standby control upon detection of a fault and wherein a cabin pressure signal is scheduled to be compared with a signal representative of the actual cabin pressure comprising:

means coupled to the desired cabin pressure signal for producing an output signal having a magnitude proportional to the rate of change of the desired cabin pressure signal, and switch means responsive to the output signal for transferring the cabin pressure control to the standby cabin control when said output signal exceeds a predetermined magnitude.

2. A device as recited in claim 1 wherein said output signal producing means further comprises:

a differentiating network coupled to the desired cabin pressure signal, and an operational amplifier coupled to the output of the differential network.

3. A device as recited in claim 2 and further comprising:

means comparing the actual cabin pressure signal with the desired cabin pressure signal and producing an error signal indicative of the difference therebetween, a tracking circuit responsive to the error signal for selectively feeding back extreme values of the error signal to the rate limiter desired cabin pressure signal to track the actual cabin pressure within predetermined limits, and where said differentiating network is coupled to the rate limited desired cabin pressure signal.

4. A device for transferring the control of an aircraft cabin pressure from automatic to a standby control upon detection of a fault in one of the pressure representative voltages generated in the control comprising:

means generating a voltage having a magnitude indicative of a preselected maximum rate of change of a selected pressure representative voltage, means coupled to the pressure representative voltage for producing an output voltage having a magnitude proportional to the rate of change thereof, and switch means responsive to the output voltage and the preselected maximum voltage for transferring the cabin pressure control to the standby control when the output voltage exceeds the preselected voltage.

5. A device as recited in claim 4 wherein the output voltage producing means comprises:

a differential amplifier having a feedback resistor, a differentiating network including said feedback resistor and effectively coupled between the pressure representative signal and the input to the differential amplifier.

6. A device for transferring the control of an aircraft cabin pressure from automatic to a standby control upon detection of a fault in one of the pressure representative voltages generated in the control comprising:

means generating a threshold voltage having a magnitude indicative of a maximum permissible value of a selected characteristic of the pressure representative voltage, means coupled to the pressure representative voltage for producing an output voltage having a magnitude proportional to the rate of change and to rapid magnitude changes thereof, and switch means responsive to the output voltage and the threshold voltage for transferring the cabin pressure control to the standby control when the output voltage exceeds the threshold voltage.

7. A device as recited in claim 6 wherein the threshold voltage is indicative of both the maximum permissible slow rate of change and the maximum permissible rapid change of the pressure representative voltage.

8. A device as recited in claim 7 wherein the output voltage producing means includes an amplifier having a feedback resistor and a capacitive network interconnecting the pressure representative voltage with the input to the amplifier, said network having a resistor in series with a capacitor.

References Cited

UNITED STATES PATENTS 2,830,521   4/1958   Fischer              98—1.5
3,375,771   4/1968   Balcom             98—1.5

MEYER PERLIN, *Primary Examiner.*